(12) United States Patent
Fischer et al.

(10) Patent No.: US 6,208,338 B1
(45) Date of Patent: Mar. 27, 2001

(54) ONLINE DOCUMENTATION AND HELP SYSTEM FOR COMPUTER-BASED SYSTEMS

(75) Inventors: Martin Fischer, Heilbronn; Horst Perner, Boeblingen, both of (DE)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/079,985

(22) Filed: May 15, 1998

(30) Foreign Application Priority Data

May 28, 1997 (DE) .............................................. 971 08 592
Jul. 18, 1997 (DE) .............................................. 971 12 319

(51) Int. Cl.[7] .................................................. G06F 13/00
(52) U.S. Cl. .......................................... 345/338; 345/336
(58) Field of Search ..................... 345/336, 338, 345/329–332, 356, 357; 707/501; 395/701

(56) References Cited

U.S. PATENT DOCUMENTS

| | | | |
|---|---|---|---|
| 4,800,485 | * | 1/1989 | Ackroff et al. ....................... 364/200 |
| 5,287,448 | * | 2/1994 | Nicol et al. ........................... 395/159 |
| 5,434,963 | * | 7/1995 | Kuwamoto et al. .................. 395/155 |
| 5,483,632 | * | 1/1996 | Kuwamoto et al. .................. 395/156 |
| 5,513,308 | * | 4/1996 | Mori ..................................... 395/155 |
| 5,517,605 | * | 5/1996 | Wolf ..................................... 395/155 |
| 5,535,323 | * | 7/1996 | Miller et al. ......................... 395/155 |
| 5,546,521 | * | 8/1996 | Martinez .............................. 395/155 |
| 5,877,757 | * | 3/1999 | Baldwin et al. ..................... 345/336 |

FOREIGN PATENT DOCUMENTS

97108592 * 6/1997 (DE) .
97112319 * 9/1997 (DE) .

OTHER PUBLICATIONS

Windows NT Web Server Book by Larry Budnick & Ventana Communications Group, Inc., Apr. 15, 1996.*

* cited by examiner

Primary Examiner—Jeffery Brier
Assistant Examiner—G. F. Cinningham

(57) ABSTRACT

An integrated online information system includes an online help engine for requesting and receiving a documentation and/or help information, an address database for storing addresses of the documentation and/or help information, and a browser for receiving the documentation and/or help information in a network architecture corresponding to an address applied to the browser.

11 Claims, 2 Drawing Sheets

ONLINE DOCUMENTATION AND HELP SYSTEM FOR COMPUTER-BASED SYSTEMS

BACKGROUND OF THE INVENTION

The present invention generally relates to documentation and help systems for computer-based systems.

Today, most computer-based systems (data processing systems) provide some kind of written documentation and, in combination thereto, a help system. The documentation generally represents the aids provided for understanding the structure and intended uses of the system or its components, mainly describing the requirements, capabilities, limitations, design, operation, and maintenance of the system. The help system generally provides one or more display images that describe how to use an application or how to do a system operation. In most cases, the help system is started by a help key as a function key that displays a help text when it is pressed, or by selecting a help menu describing alternative actions when a user encounters a problem with the system or application.

The documentation may be embodied by printed manuals and/or as online documentation. The online documentation may be stored within the computer system or onto a server in a network structure, e.g. in a public network such as the Internet or in an internal proprietary network (intranet), allowing navigation within the documentation by so-called "hyperlinks" which link documentation pages stored on different locations in either the same or different servers. The online documentation typically provides a document reader for reading specified documentation files which generally do not coincide with such information used for the help system.

In most cases, the help system is implemented as an online help function in the computer system. Online help systems provide the user of the computer system with some assistance when performing a particular task. The online help systems may be context sensitive, meaning that an information requested depends on the context within the current application. The context sensitive online help system enables the user to quickly access help information, for example, by pressing a dedicated help key while a mouse cursor is pointing to an area of interest.

Online as used herein means that the respective information is accessible directly by the computer system and, e.g., while an application is running on the computer system.

FIG. 1 shows a help system for a computer system as known in the art. A display 10 within the computer system displays a mouse cursor 20 pointing on an area of interest 30. A dedicated help key 40 is embodied, e.g., within a terminal 50. On request by the help key 40 over a line 45, a help engine 60 provides a help information via a line 65 to the computer system which again may be displayed by the display 10. The provided help information may be context sensitive meaning that the help information is related to the specific context of the area of interest 30 as pointed out by the mouse cursor 20 (as indicated by arrow 67). The help engine 60 searches for the help information by applying a context related signal on a line 68 to a database 70 and receiving the help information on a line 75.

In most cases, the database 70 is implemented as an indexed database, meaning that an access path to a file 80 within the indexed database 70 is built on key values, and a record 90 in the file 80 is identified by a key field. The record 90 contains an information page comprising information requested as the help information. The position of the record 90 is recorded in an index as a separate portion of the file 80. The indexed database 70 contains the indices as well as the thereto corresponding text information within the respective records of the file 80, however in a compiled data format. The indexed database 70 usually receives its information from text files 110 generally compiled by a compiler 120.

The information page of the record 90 might also comprise an indexed cross reference 100 to one or more other records. Cross references 100 such as links to other related information pages are handled by the help engine 60 and are stored and maintained within the database 70.

One major disadvantage of today's solution is that the documentation is strictly separated from the help functionality. The help information might give a brief description of a particular task and it is up to the user to look into the appropriate section of the documentation to get more information about the underlying concepts etc.

Another disadvantage is that today's online help systems generally use some kind of proprietary help compiler 120 needed to translate the textual representation of the help information into the text file 110 to a compiled form which is suitable for the proprietary context sensitive help system in the indexed database 70. This implies that customizing the help information requires access to and knowledge about the respective proprietary compiler 120.

In automated test equipment (ATE) systems, it has been found particularly difficult to use online help functions or online documentation, since ATE systems are generally not used in standard applications predefined by the supplier of the ATE system, but in very specific customer-oriented applications defined by the user of the ATE system. This makes it quite difficult for the supplier of the ATE system to provide a document useful for a plurality of customers.

Further more, most of the knowledge about the processes to be executed by the ATE systems and the environment wherein the ATE system is to be used, which is to be outlined in a documentation and/or required for help systems, is generally not owned by the supplier of the ATE system, but by the user thereof. In that case, the user of the ATE system needs to 'write' an own (customer internal) user documentation describing the use of the ATE system in the respective customer's environment.

SUMMARY OF THE INVENTION

It is an object of the invention to provide an improved documentation and help system for computer-based systems in general, and in particular for ATE systems.

According to the invention, the documentation and help system is combined in an integrated online information system comprising an online help engine for requesting and receiving documentation and help information, an address database for storing addresses of documentation and help information, and a browser for receiving documentation and help information in a network architecture corresponding to an address applied to the browser.

The online information system assists users of the data processing system in quickly retrieving any information at any level of detail. Integrating the documentation and help system also ensures consistency between both types of information.

The integrated online information system according to the invention allows to format a text and to process links to other sources of information avoiding the disadvantages of using proprietary formats in a proprietary online help information as known in the art. Thus, it is easy for users to extend and maintain the information provided by the computer or software system vendor to include best practices, personalized examples, links to other information found in the network, etc. In an ATE environment, it is possible to provide direct links to test related design information such as device data sheets, schematics, etc.

In a preferred embodiment, the invention also allows the user to directly access and maintain the online documentation (which can also be used for online help purposes) by means of the browser without requiring an access to the online help engine or to other software tools.

BRIEF DESCRIPTION OF THE DRAWINGS

Other objects and many of the attendant advantages of the present invention will be readily appreciated and become better understood by reference to the following detailed description when considering in connection with the accompanied drawings, in which.

DETAILED DESCRIPTION OF THE INVENTION

Figure 1:
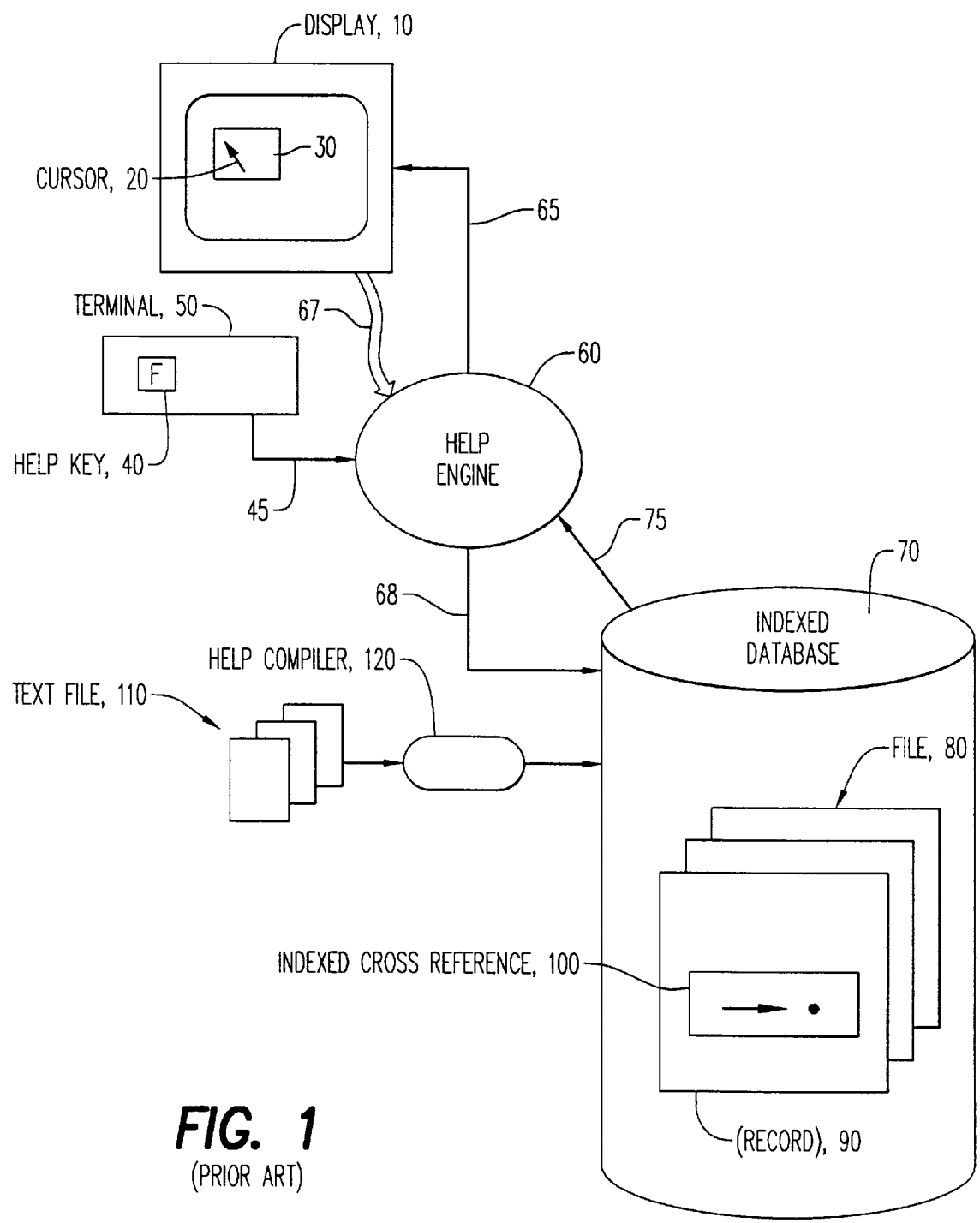
FIG. 1 shows a help system for a computer system as known in the art.
Figure 2:
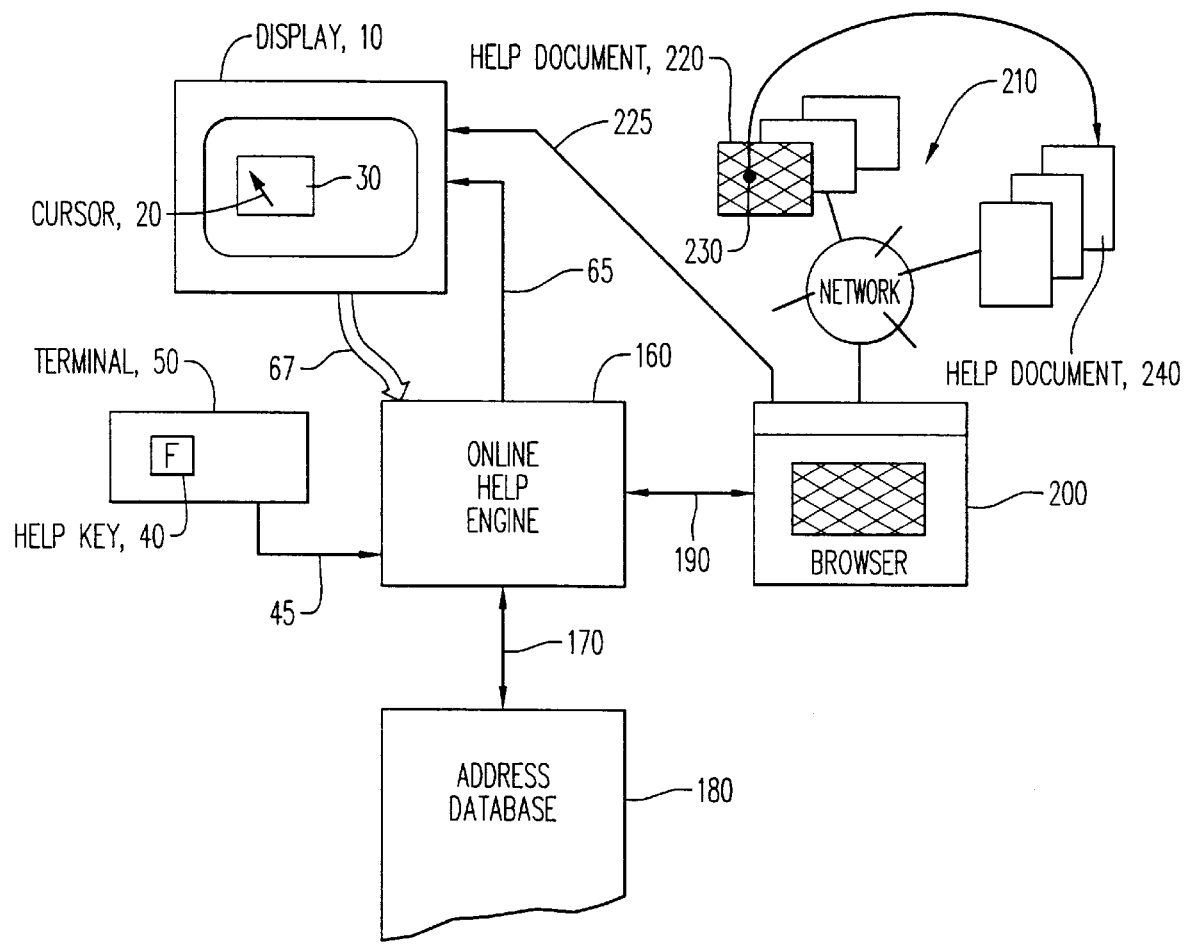
FIG. 2 shows a preferred embodiment of a documentation and help system for computer-based systems according to the invention.

FIG. 2 shows a preferred embodiment of a documentation and help system for computer-based systems according to the invention. On request by the help key 40 over the line 45, an online help engine 160 provides an online help information to the computer-based systems.

The online help engine 160 searches for the online help information by applying a search signal on a line 170 to an address database 180 and receiving therefrom a respective help address corresponding to the search signal.

The provided online help information is preferably context sensitive meaning that the online help information is related to the specific context of the area of interest 20 as pointed out by the mouse cursor 20 (as indicated by arrow 67). In that case, the search signal on line 170 is a context related search signal.

The online help engine 160 uses the help address received from the address database 180 for instructing over a line 190 a browser 200. The browser 200 searches in a therewith connected network 210 for a specific help document 220 corresponding to the received help address and receives, if available, the help document 220 or a copy therefrom. It is to be understood that the term 'network' as used herein means any arrangement of nodes and connecting branches for connecting data stations, and can comprise a plurality of individual network systems, however connected anyhow.

The browser 200 may apply the received help document 220 or a copy therefrom to the online help engine 160, which again applies the help document 220 or the copy therefrom as the online help information to the computer system, e.g., via the line 65 to the computer system which again may be displayed by the display 10. However, in a preferred embodiment, the browser 200 directly applies the received help document 220 or the copy therefrom to the computer system and thus e.g. to the display 10, as indicated by arrow 225. In that case the browser 200 allows to directly view the received help document 220 on the display 10 without requiring an additional support by the online help engine 160 or by other tools.

The help document 220 may also comprise a reference 230 comprising an address of another help document 240 which might be related to the content of the help document 220. The reference 230 is preferably embodied by a standard network hyper-link, e.g. as an universal resource locator (URL), which can directly be processed by the browser 200.

The address database 180 comprises addresses of help documents, preferably in a form which can be directly processed by the browser 200 such as an appropriate universal resource locator (URL). In case of a context sensitive help, the address database 180 further comprises context relevant references in order to refer a specific help document to a specific context. In other words, the address database 180 comprises addresses of such information required within the documentation and help system to provide the requested documents within the network 210.

The addresses stored in the address database 180 can be addresses pre-given by the supplier of the computer-based system as well as addresses determined by the user or owner of the system. This allows to create a customized documentation and help system, which is particularly desirable in ATE applications.

In a preferred embodiment, a customizing of the documentation and help system can be accomplished by directly editing and configuring the help documents and by including references 230 into the help documents. This can be preferably done by means of a specific browser 200 allowing to directly edit documents. Using for example the WWW's capability to format text and process hyper-links avoids the disadvantages of using proprietary formats for the online help information. Thus, it's easy for users to extend and maintain the information provided by the system vendor to include best practices, personalized examples, links to other information found on the WWW, etc. It also allows the user to distribute the online documentation help over a global network. The documentation can be easily globally maintained and updated. It also allows the user to access and maintain the online documentation (which is also used as an online help) without having access to the software system itself (by using any standard web browser and/or web page authoring system).

The network 210 might be a publicly accessible network such as the world wide web (WWW) or Internet, or a publicly not accessible internal proprietary network such as an Intranet. The browser 200 might be a customized browser or a standard browser (e.g., a WWW browser) as known in the art.

The online help engine 160 does not necessarily need to be an entirely new help engine and can be based on the help engine 60 as known in the art. Because most existing (proprietary) help systems provide means to intercept events fired when pressing the help system's help key 40, it is possible to integrate the online help engine 160 which preferably maps the position of the mouse pointer (preferably the name or an identifier of a widget where the pointer is located at) to an URL of the address database 180 and passes that URL to the dedicated or standard web browser 200 used to view the online documentation and navigate therein.

The online help engine 160 can be used for help function purposes as well as for documentation purposes. The online help engine 160 allows to read respective documents, e.g. help document 220, whenever required. It allows the user to access and maintain the online documentation, which is also used as an online help, without requiring an access to other software tools. This is preferably accomplished by means of the browser 200 which can be a standard web browser and/or web page authoring system.

In a preferred embodiment, the browser 200 can be used and applied by the user completely independent of the online help engine 160 and therefore of an application using or starting the online help engine 160. The browser 200 provides a stand alone tool for reading, writing, and configuring documents required for help and documentation purposes, whenever required. It allows the user to directly access and maintain the online documentation, which is also used as an online help, without requiring an access to other software tools.

What is claimed is:

1. An integrated online help information system for a computer comprising:

an address database for storing addresses of help documentation information and help information relating to operation of said computer, said address database preloaded by a supplier of said computer and modifiable by a user of said computer;

an online help engine for requesting and receiving documentation information and help information, said online help engine responsive to a user request to access a help address from said address database; and a browser responsive to receipt of an instruction including said help address from said online help engine to access and retrieve help documentation information and help information over a network, from an address corresponding to said help address and to provide said help documentation information and help information to said online help engine for provision to said user.

2. The system according to claim 1, wherein the browser allows direct access to and maintenance of the documentation information and help information.

3. A method for requesting and receiving help documentation information and help information relating to operation of a computer, comprising the steps of:

enabling an online help engine to respond to a user request for help with respect to said operation of the computer by requesting a help address for help documentation information and help information from an address database which stores addresses of the help documentation information and help information, said address database comprising at least one of addresses provided by a supplier of said computer or, addresses determined by a user of said computer;

providing said help address from said address database to a browser to enable said browser to retrieve the help documentation information and help information over a network, from a source corresponding to the help address; and transferring to said user the help documentation information and help information retrieved over said network from the help address.

4. The system according claim 1, wherein the help information is related to a specific context of an area of interest as designated by a location of a mouse cursor at the time of said user request.

5. The system according to claim 1, wherein the network architecture is a publicly accessible network.

6. The system according to claim 1, wherein the network is an internal network that is not accessible to the public.

7. The method according claim 3, wherein the help information is related to a specific context of an area of interest as designated by a location of a mouse cursor at the time of said user request.

8. The method according to claim 3, wherein the network architecture is a publicly accessible network.

9. The method according to claim 3, wherein the network is an internal network that is not accessible to the public.

10. An automated test system for testing electronic devices comprising:

an address database for storing addresses of help documentation information and help information relating to operation of said automated test system, said address database preloaded by a supplier of said automated test system and modifiable by a user of said automated test system;

an online help engine for requesting and receiving documentation information and help information, said online help engine responsive to a user request to access a help address from said address database; and a browser responsive to receipt of an instruction including said help address from said online help engine to access and retrieve help documentation information and help information over a network, from an address corresponding to said help address and to provide said help documentation information and help information to said online help engine for provision to said user.

11. The system according claim 10, wherein the help information is related to a specific context of an area of interest as designated by a location of a pointing device at the time of said user request.

* * * * *